(12) United States Patent
Meempat et al.

(10) Patent No.: US 6,778,496 B1
(45) Date of Patent: Aug. 17, 2004

(54) DISTRIBUTED CALL ADMISSION AND LOAD BALANCING METHOD AND APPARATUS FOR PACKET NETWORKS

(75) Inventors: Gopalakrishnan Meempat, East Brunswick, NJ (US); David J. Houck, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 773 days.

(21) Appl. No.: 09/589,304

(22) Filed: Jun. 7, 2000

(51) Int. Cl.[7] .............................................. H04L 12/28
(52) U.S. Cl. ...................................... 370/230; 370/238
(58) Field of Search ................................ 370/230, 238, 370/351; 375/347; 707/10; 709/225; 717/133

(56) References Cited

U.S. PATENT DOCUMENTS

| | | | | |
|---|---|---|---|---|
| 5,828,883 A | * | 10/1998 | Hall ........................... | 717/133 |
| 5,862,192 A | * | 1/1999 | Huszar et al. ............... | 375/347 |
| 5,956,716 A | * | 9/1999 | Kenner et al. ................ | 707/10 |
| 6,081,506 A | | 6/2000 | Buyukkoc et al. | |
| 6,175,870 B1 | * | 1/2001 | Gawlick et al. ............ | 370/351 |
| 6,212,184 B1 | * | 4/2001 | Venkatachary et al. ..... | 370/238 |
| 6,633,544 B1 | * | 10/2003 | Rexford et al. ............. | 370/238 |
| 2003/0187986 A1 | * | 10/2003 | Sundqvist et al. .......... | 709/225 |

* cited by examiner

Primary Examiner—Salvatore Cangialosi

(57) ABSTRACT

A method and apparatus to control call admission to a packet-based network and achieve load balancing over a packet-based network includes at selected times generating and sending a path status message along a defined path, such as an MPLS path, through the network. As the message travels along the path, a cost metric field within the message is updated. The cost metric may reflect available bandwidth, or percentage utilization of the aggregate bandwidth, on the most congested (bottleneck) link in the path that it tracks. The cost metric is determined for each link at a data measuring point, such as individual routers, along the path. The optimum path between two gateways is determined, and further packet streams are routed onto the optimum path. In the event that no paths between a source and destination gateway meet predetermined utilization criteria, a packet stream block indicator is set which shows a requesting edge router that no paths are currently available for a packet stream requesting routing between particular source and destination gateway. The path utilization status message may be generated alternately in routers or in a master gateway. In either case, the messages are sent and the status of the network is determined in a distributed fashion at selected times, such as a regular timed interval.

27 Claims, 4 Drawing Sheets

10

DISTRIBUTED CALL ADMISSION AND LOAD BALANCING METHOD AND APPARATUS FOR PACKET NETWORKS

BACKGROUND OF THE INVENTION

The present invention relates to network communication systems. It finds particular application in conjunction with controlling admission of Voice-Over IP (VoIP) calls to a packet-based network, and efficiently selecting paths for the admitted calls, so as to balance the packet loads within the network. However, it is to be appreciated that the present invention is also amenable to any type of service requiring connection management, irrespective of traffic burstiness or other factors, and to other like applications such as TCP requiring admission control, video or data transport where a need exists to improve the quality of service (QoS) of data transfer over a network including network scenarios with multiple applications having distinct QoS constraints.

The internet, intranets, and other internet protocol (IP) networks are handling ever increasing volumes of data. Beyond the worldwide web and e-mail capabilities of such networks, applications and protocols are being developed to further add to the volume of traffic. Among these are voice related applications such as telephony or Voice-Over IP, and video applications, such as video telephony, video conferencing, and the like. Unfortunately, even at current usage levels packet loss due to congestion is becoming problematic degrading the performance of data transfer.

Streams of packets typically enter the network from packet switching edge devices or gateways which serve as portals to the interconnected web of routers comprising the network. Typically these gateways are indiscriminant in their treatment of packet streams in that they merely port the packet streams onto the network without regard for congestion levels or likelihood of the packets reaching their final destination. Moreover, the networks typically are unaware of any coherence or association among packet streams, and merely forward individual packets from router to router on a first-come-first-served basis, without regard to their relative priorities. These two limitations severely constrain the ability to provide quality-of-service guarantees for real-time services such as voice in IP-based networks.

Some attempts have been made to address portions of this problem. For example, packet prioritization schemes such as differentiated services or Diffserv distinguish packet streams among several classes. Protocols are also evolving which route higher priority packets more reliably, for example, by allocating certain bandwidth on links between routers for each class. Another partial solution that has been articulated is that of establishing explicit routing paths through the network between frequently traveled points. Multi-protocol label switching (MPLS) is a protocol which enables a label to be assigned to a packet stream which specifies a predetermined path through the network. This allows better monitoring and control of congestion over the paths taken by voice streams, for example. However, the problem introduced by edge-devices not being aware of the congestion levels within the interior of the network still remains. One strategy being pursued to tackle this limitation is to dedicate a certain amount of bandwidth for each MPLS path, on each network link that it traverses. This creates a set of voice trunks among all pairs of nodes, much akin to the telephone trunk routes currently employed between circuit switches, and hence abandon the inherent flexibility afforded by the IP network. In particular, this strategy does not lead to a scalable solution. The number of trunks grows as the square of the number of edge nodes, and the consequent bandwidth fragmentation among hundreds or thousands of MPLS paths can exhaust the link capacities rather quickly. Furthermore, the servicing and provisioning of the multitude of voice trunks across the network are both cumbersome and slow to accommodate new nodes within the network.

The present invention contemplates a new and improved method and apparatus for call management over IP networks which overcomes the above-referenced problems and others associated with the existing approaches.

BRIEF SUMMARY OF THE INVENTION

The above problems are alleviated and an advance is made over the prior art in accordance with the teachings of applicants' invention wherein, a method of regulating admission of packet streams to a network includes at selected times sending path status messages along a set of paths in the network. A cost metric in each path status message is updated at the intermediate nodes as the message progresses along its defined path. Based on the final cost metric values collected upon receipt of the status messages at the respective path edges, subsequent packet stream arrivals are selectively blocked or admitted to the network.

In accordance with another aspect of the present invention, the method further provides choosing an optimal path between a source and a destination gateway.

In accordance with another aspect of the present invention, the paths through the network include a plurality of interconnected links, each potentially operating at different capacities or utilizations. The "choosing an optimal path" step optionally includes determining a most utilized bottleneck link for each of the alternative path choices through the network (for the source and destination gateways in question), and then selecting the path whose bottleneck link is the least utilized among the set of bottleneck links corresponding to the available path choices.

In accordance with another aspect of the invention, the paths through the network include a plurality of interconnected links, each path potentially having different numbers of links. The "choosing an optimal path" step optionally includes selecting a path through the network based on the combination criteria of having smaller bottleneck link utilization and having fewer links compared to other paths.

In accordance with another aspect of the present invention, the path includes a plurality of links interconnecting routers. The "updating a cost metric" step includes measuring link usage at the routers.

In accordance with another aspect of the present invention, each path is comprised of links that are adapted to discriminate between different classes of packet streams. The "updating a cost metric" step includes measuring usage by individual class.

In accordance with another embodiment of the present invention, a system for controlling admission of a packet stream along a path includes a plurality of routers adapted to update a cost metric in a path status message upon receipt of the message at each router. The system further includes a plurality of links interconnecting the routers where selected links and routers together comprise the path through the network.

In accordance with another aspect of the present invention, the plurality of routers are further adapted to generate, and send, the path status message along the determined path at selected times.

In accordance with another aspect of the present invention, the system alternately includes a gateway adapted to generate, and send, the path status message along the predetermined path at selected times.

In accordance with another aspect of the present invention, each of the plurality of routers is further adapted to select an optimum path through the network in response to receipt of a packet stream admission request.

In accordance with another aspect of the present invention, the plurality of routers are further adapted to discriminate between path status messages, and other (payload) packets.

In accordance with another aspect of the present invention, the plurality of links interconnecting the routers are adapted to discriminate between classes of packet streams, e.g., via Weighted Fair Queuing or WFQ.

In accordance with another embodiment of the present invention, a method includes sending a path status message along a defined path and, as the path message progresses through a plurality of routers in the path, updating a cost metric in the path status message at the routers that it transits through.

In accordance with another aspect of the present invention, the method further includes generating an indicator where the indicator shows an optimal path between a source and a destination, or where the indicator shows that no path presently meets admission control criteria.

In accordance with another aspect of the present invention, the "generating an indicator" step showing that an optimal path exists between a given source destination node pair optionally includes determining a most utilized bottleneck link for each candidate path through the network between these two nodes. The method further includes optionally selecting as the optimal path, the path whose bottleneck link utilization is the smallest among the set of bottleneck links of the candidate paths, and placing an identifier for the selected optimal path into the path status message.

In accordance with another aspect of the present invention, the "generating an indicator" step to show an optimal path optionally includes selecting a path through the network based on the combination criteria of having smaller bottleneck link utilization and having fewer links compared to other path alternatives.

In accordance with another aspect of the present invention, the method further includes discriminating between path status messages and other (payload) packets.

In accordance with another aspect of the present invention, "the updating a cost metric" step includes measuring link usage at individual routers.

In accordance with another aspect of the present invention, each path is comprised of a set of links which are adapted to discriminate between classes of packet streams, and the "updating a cost metric" step includes determining cost data by packet class.

One advantage of the present invention resides in accurately sensing individual link utilizations by periodically measuring traffic flow.

Another advantage of the present invention resides in the system being distributed across the network, thus not requiring any centralized database.

Still another advantage of the present invention resides in providing quality of service guarantees to packet streams entering the network.

Still another advantage of the present invention resides in the inherent flexibility and scalability of the call admission and load balancing systems.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

The distributed scheme for CAC and LB is measurement-based. Thus, traffic measuring points, such as the IP routers, are directly involved in monitoring the link occupancy status and generating the intelligence for making call control decisions. To this end, suitable traffic measurement capabilities are implemented at the routers. Desirably, this does not depend on the ability to precisely specify the projected traffic profile of each call during setup. Rather, it adopts a learning approach based on actual measurements.

Figure 1:
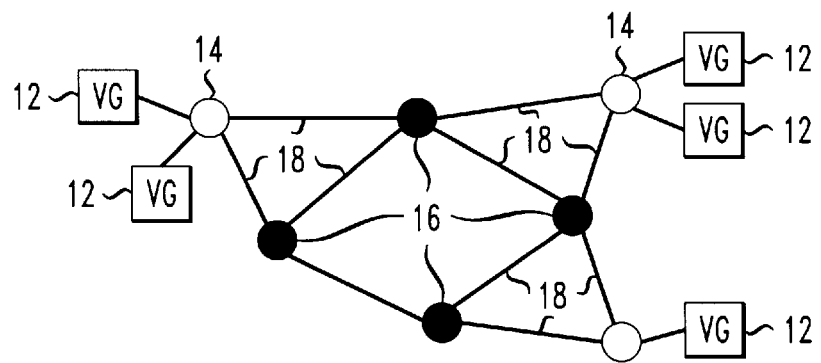
FIG. 1 is a simplified illustration of a network upon which the present invention may be practiced.

Referring to FIG. 1, the IP transport network 10 supports certain basic QoS features. In the simplified illustration, gateways 12 provide connectivity through edge routers 14 to network of transit routers 16 and interconnecting links 18. Here some form of defined path routing, for example MPLS, is preferably in place to carry the application payload subject to the CAC and LB function; this facilitates better control of QoS. To this end, multiple spatially diverse MPLS explicit paths (unidirectional) dedicated to the application are set up from each edge router 14 to every other edge router 14. Path redundancy serves to improve reliability and allows load balancing. Furthermore, a packet prioritization scheme such as Diffserv is implemented at the routers to support QoS management. Those skilled in the art however, recognize the desirability of functional independence between MPLS and traffic prioritization, if implemented. To be specific, no bandwidth is reserved per MPLS path since that would limit scalability and achievable statistical multiplexing gains. In contrast, a certain aggregate bandwidth is reserved on each network link 18 for the application in question, by virtue of a suitable Diffserv policy (e.g., WFQ) implemented at the routers 14, 16. The MPLS paths carrying traffic belonging to this application are then allowed to fully share the reserved bandwidth segment. One way towards achieving this capability is to perform only packet forwarding based on the MPLS shim header, with traffic prioritization (e.g., WFQ) being based on the class-based queueing (CBQ) field within the IP header that distinguishes its service class.

With a Diffserv arrangement, the portion of the network bandwidth resources dedicated to the application in question can be isolated from other traffic streams, in which case it may be regarded as a distinct sub-network for traffic management purposes. With this perspective, the term link henceforth refers to the portion of the capacity of the physical link 18 dedicated to the candidate application. Also, references to link occupancy measurements are to be interpreted as occupancies of the reserved portions.

As mentioned previously, link traffic measurements implemented at the IP routers 14, 16 form the foundation of the measurement-based algorithm to be presented. In contrast, schemes that make use of declared values of bandwidth usage require highly predictable traffic behavior. Measurement-based approaches such as the one presented here, on the other hand, give the power to learn and abstract from the observed behavior of the composite traffic.

Alternatives exist for the nature of traffic measurements implemented at the routers 14, 16, for example measurements may be either link utilizations or, alternately residual bandwidths, as observed over specified measurement intervals. For traffic streams such as voice with fairly deterministic behavior, an average value over each measurement interval will usually suffice. More sophisticated approaches may however be needed for relatively bursty applications such as TCP. For example, each measurement interval may be divided into suitably chosen sub-intervals, with peak values being reported.

Figure 2:
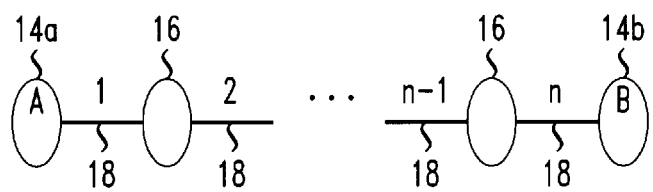
FIG. 2 is an illustration of a single path through the network of FIG. 1.

Reference to FIG. 2 illustrates a family of cost functions usable by the distributed CAC and LB algorithm (more fully described below). A path from edge node 14a to edge node 14b traverses n links 18, indexed 1, 2, . . . , n−1, n.

In order to discuss cost the following parameters are defined:

$C_1(i)$=the cost of link i, i=1,2, . . . , n;
$C_p$=the cost of the MPLS path; and
$C_p^{(i,j)}$=the cost of the partial path segment comprised of links i, i+1, . . . , j. Clearly, $C_p = C_p^{(1,n)}$.

The distributed algorithm will work in conjunction with the family of cost functions that satisfy the following memoryless property:

$C_p^{(1,1)} = C_1(1)$;
$C_p^{(1,i+1)} = F(C_p^{(1,i)}, C_1(i+1))$, i=2, . . . , n, where F(x,y) is any arbitrary scalar operator on x and y.

Assuming that there are r distinct (spatially diverse) MPLS paths across the IP network from edge node 14a to edge node 14b, let the path cost associated with any alternative i be represented by $C_p(i)$, i=1, . . . , r. Now the optimal path k from edge node 14a to edge node 14b is selected based on the rule that its associated path cost $C_p(k)$ is less than or equal to the cost $C_p(i)$ associated with every other path i, from among the available set of alternatives 1, . . . , r.

Examples of path cost metrics that satisfy the above conditions include the following:

1. Maximum Utilization:
$C_1(i)$ is the percentage utilization of link i, and F(x,y)=Max (x,y). In other words, the chosen path is that one with the least loaded bottleneck link (in a percentage utilization sense).

2. Minimum Residual Capacity:
$C_1(i)$ is the negative of the residual capacity on link i, and F(x,y)=Max(x,y). This is similar to the previous example, except that an absolute residual capacity is used instead of percentage utilization.

3. Additive Cost Metrics:
$C_1(i)$ is some non-decreasing concave function of the percentage utilization of link i that reaches large values as the utilization approaches 100% (e.g., tan(utilization×π/2)), and F(x,y)=x+y. This example, besides minimizing the load on the bottleneck link, encourages selection of shorter paths (when there are alternatives with comparable congestion levels, but widely different path lengths).

With cost metrics presented, a generic framework for the distributed algorithm for CAC and LB is needed. Slight variations will be necessary for deployment in actual applications, and specific implementations to support VoIP applications will be explored below.

In order to discuss a generic framework, the following parameters are defined:

$m_e$: Number of edge routers 14 in the network 10.

r: Number of MPLS paths set up for the candidate application from each edge router 14 to each of the other edge routers 14. This need not be identical throughout the network but we will make that assumption here for convenience.

T: Duration of a status update interval (defined below)

Assuming the implementation of Diffserv at the routers, the number of distinguishable traffic classes on each link is represented by J. In general, each application has an associated class identifier j∈1, . . . , J. As discussed above, each router 14, 16 will report a distinct occupancy measurement (cost) corresponding to each class on each incident link 18. Accordingly we have the following variant of the link cost parameter $C_1(i)$ defined above when discussing cost metrics.

$C_1(t, j)$=The cost of link t, corresponding to traffic class j∈1, . . . , J

To simplify the discussion, here a call is regarded as a single unidirectional flow of IP packets. Those skilled in the art will appreciate that actual applications, such as VoIP, for example, could involve two flows, one in each direction. Customization of the generic framework to the VoIP application scenario will be more fully discussed below. As is clear, there are a total of $m_e(m_e-1)r$ unidirectional MPLS paths in the network dedicated to the candidate application.

The algorithm is based on the propagation of a special type of control message, referred to as a Path Utilization Status Message (PUSM) among the routers 14, 16. Besides the capability to measure link occupancies, the routers are equipped with a few additional capabilities to support CAC and LB. In particular, each transit router 16 implements a special function, which we will refer to as Path Status Processor (PSP). Similarly each edge router 14 implements two functions, which we will refer to as PUSM Generator (Pgen) and Path Selector (PSEL). The roles of these modules will become clear below. Note that these capabilities may be implemented at the routers 14, 16 as applications that ride above layer 3, or may be more closely integrated with the MPLS label switching function. These alternatives are discussed in greater detail below.

To illustrate the Pgen functionality at a specific edge router E, r outgoing MPLS paths from node E destined for each other edge router are indexed as 1, 2, . . . , r. The Pgen module is programmed to be aware of the following mappings, corresponding to each remote edge router F and each path i destined to it:

$Lnk_{ER}(F, i)$: The outgoing link corresponding to path i leading to the remote edge router F.

$Tag_{ER}(F, i)$: The outgoing MPLS tag corresponding to path i leading to the remote edge router F.

(Note: the ER subscript is used here to differentiate the above mappings from analogous yet slightly different mappings used at the transit routers 16.)

Figure 3:
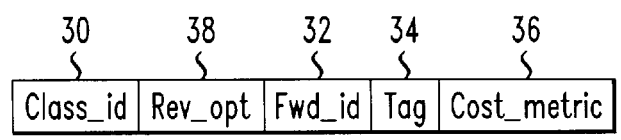
FIG. 3 is a generic path utilization status message, PUSM, for propagation along a determined path.

The above two parameters designate the contents of a Next Hop Label Forwarding Entry (NHLFE) in the MPLS Incoming Label Map (ILM) at node E, that the path i destined for remote node F is bound to. As mentioned earlier, node E maintains a link cost parameter $C_1(t, j)$ for each outgoing link t and traffic class $j \in 1, \ldots, J$, which is updated at regular intervals of length T by virtue of the measurement capability, this parameter can be queried by Pgen. At regular intervals of T, Pgen at node E generates a set of PUSM's, one for each outgoing MPLS path ($r(m_e-1)$ altogether). The PUSM format is illustrated in FIG. 3.

The Class_id field 30 is always set to the traffic class identification number that corresponds to the application in question. As will become clear, this parameter is used to extract the particular measurements that pertain to the link bandwidth segments allocated to the application in question. Note, however, that the Class_id field 30 can be eliminated if instead an additional field indicating the traffic class number is included as part of each NHLFE in the MPLS ILM tables. Those skilled in the art will appreciate that while the class information is carried in the PUSM, it could alternately be effectively carried by modified ILM tables or other data structures.

For the message corresponding to MPLS path i destined for edge router F, Fwd_id 32 is set to i, Tag 34 is set to $Tag_{ER}(F, i)$, and Cost_metric 36 is set to $C_1(Lnk_{ER}(F, i), Class\_id)$. Rev_opt 38 is set to the index of the currently known optimal (reverse) path from node F to node E. Note that the latter index has only local significance at the path originating edge node F, and here it relays its identity back to node F in "piggyback" style. As further discussed below, this index is available from the variable Best_Revpath(F) which is maintained and periodically updated by the PSEL module, based on information gathered from the received PUSM's corresponding to the reverse paths. Also, a negative value assigned to Best_Revpath(F), or Rev_opt, is understood to mean that all paths from the remote node F to node E are blocked. The PUSM thus programmed is forwarded by Pgen to the respective adjacent node over link $Lnk_{ER}(F, i)$; the IP link referred to here could also be an ATM VP, in an IP-over-ATM scenario.

While a PUSM propagates one hop at a time, between physically adjacent IP nodes 14, 16, a few alternatives for implementing PUSM forwarding and their processing at the transit nodes 16 are examined below.

As in the case of the edge routers 14, each transit router 16 implements a traffic measurement function which reports a link cost $C_1(t, j)$ for each outgoing link t and each traffic class $j \in 1$, at regular intervals of length T; this parameter can be queried by the PSP function. The PSP at each transit node 16 is preferably aware of the following mappings:

$Lnk_{TR}(k)$: The outgoing link 18 corresponding to incoming MPLS tag k $Tag_{TR}(k)$: The outgoing MPLS tag corresponding to incoming MPLS tag k.

These can be obtained from the MPLS ILM table. Upon the arrival of a PUSM at a transit node, with Class_id=j and Tag=$k_{in}$, PSP performs the following modifications on it:

Cost_metric 36 ← F(Cost_metric, $C_1(Lnk_{TR}(k_{in}), j)$);

Tag 34 ← $Tag_{TR}(k_{in})$;

where F(x,y) is any arbitrary cost mapping function satisfying the conditions given above. The modified PUSM is then forwarded by PSP to the next node over the link $Lnk_{TR}(k_{in})$.

The PSEL function at each edge router E maintains the following set of variables, corresponding to every other edge router F:

Path_Cost(F, i): Latest estimate of the cost of the incoming MPLS path i from remote edge router F, i=1, ..., r; again, the index i has only local significance to the originating node F.

Best_Fwdpath(F): If non-negative, this parameter indicates the index (local to and recognizable by the path originating node E only) of the preferred MPLS path from this edge node (node E) to the remote edge node F. If negative it signifies that all paths from node E to node F are blocked.

Best_Revpath(F): If non-negative, this parameter indicates the index (local to and recognizable by the path originating node F only) of the preferred MPLS path from edge node F to edge node E. If negative it signifies that all paths from node F to node E are blocked.

Upon receiving a PUSM propagated from another edge router F, PSEL performs the following updates:

Best_Fwdpath(F) ← Rev_opt 38;

Path_Cost(F, Fwd_id) ← Cost_metric 36;

where Rev_opt 38 and Cost_metric 36 refer to the values in the respective fields of the PUSM that just arrived.

In general, failures at links and/or nodes are detected by separate network management functions. However, additional reliability measures may be built into the above procedures on an optional basis. With the latter, note that PSEL expects to receive successive PUSM's for each remote edge node F and index i within a maximum interval $\alpha T$, where $\alpha$ is a constant>1 suitably chosen to allow some grace period. A logical timer can be employed to this effect. If the timer expires prior to receiving an expected PUSM for edge node F and index i, Path_Cost(F, i) is set to $\infty$ (or $-\infty$, depending on the cost function used) signifying that the referenced path is not available. This action is taken to ensure robustness against link/node failures. However, a similar action is not performed on Best_Fwdpath(F) since PUSM's carrying Rev_opt 38 from node F can arrive on any of the r spatially diverse alternate paths. Indeed, this parameter could reflect obsolete and incorrect data if all paths from node F fail (to be distinguished from all paths being congested/blocked) or node F itself fails. However, the former, which amounts to a catastrophic event, as well as the latter would be detected by external network management functions. If indeed robustness against such catastrophic failures should be incorporated within the CAC and LB scheme, a similar yet distinct logical timer may be applied in connection with successive PUSM's from each remote node F, without regard to the path index field (Fwd_id). Should this timer expire prematurely, Best_Fwdpath(F) may be set to a negative value indicating that all paths are blocked, or suitable alarms triggered to notify the catastrophic event.

Once every T seconds, PSEL at node E updates Best_Revpath(F) $\in \{1, \ldots, r\}$ for each remote node F according to the following rules:

Path_Cost(F, Best_Revpath(F)) $\leq$ Path_Cost(F, i), i=1, ..., r;

If [MAXCOST $\leq$ Path_Cost(F, Best_Revpath(F))] then Set Best_Revpath(F) to a negative value.

Here the limit MAXCOST is a system-wide constant; in the context of a percentage utilization measure for example, MAXCOST could be, say, 95%.

The procedures to be taken during the arrival of a new call at an edge node E, destined for edge node F, are straightforward. Specifically, the value stored in the register Best_Fwdpath(F) is examined. If negative, the call is blocked and cleared (the CAC decision). Otherwise the MPLS path corresponding to the index i stored in this register is chosen to carry the packets belonging to the new call (the LB decision). From now on, the payload packets belonging to the new call will be forwarded on the outgoing link $Lnk_{ER}$(F, Best_Fwdpath(F)) with MPLS tags set to $Tag_{ER}$(F, Best_Fwdpath(F)). These two parameters are provided by the MPLS ILM table at edge node E.

Artisans will recognize that the strategy used in the description of the CAC and LB algorithm given above is to return the identity of the best forward path from the path terminating edge router to the path originating edge router, by piggybacking on the PUSM's flowing in the reverse direction. A distinct advantage of this embodiment, referred to as Variant A, is that the CAC and LB decisions can be made instantaneously upon call arrival at the source node itself. Nonetheless, this is achieved by adding only an extra variable (Rev_opt) to the PUSM, and hence has little impact on protocol complexity. However, there is a time lag of T between the determination of the optimal reverse path at the terminating edge node 14b and its availability at the originating edge node 14a. If T is chosen to be small compared to the dynamics of the call arrival-departure processes across the network (as is desirable), this concern would be marginalized in an asymptotic sense.

On the other hand if T is relatively large then possibly the control decisions at the source nodes will be based on obsolete information. There are two alternatives to overcome this limitation, which we will refer to as Variant B and Variant C. In both cases, the piggybacking operation is eliminated and replaced with other functions. Consequently, the PUSM will no longer have a Rev_opt field. The specific details of the two variants are given below:

Variant B:

A distinct Path Identity Indicator Message (PIIM) is propagated from an MPLS terminating edge node F to the originating edge node E, whenever a change occurs to the value of the register Best_Revpath(E) at node F. Upon receiving a PIIM from node F, node E updates the local Best_Fwdpath(F) with its content. For added reliability, a "Keepalive" strategy may optionally be adopted by enforcing the transmission of PIIM's at least once every $\tau$ sec with a logical timer. In this case, the originating node E would set Best_Fwdpath(F) to a negative value if it did not receive a PIIM from the terminating node F within an expected maximum interval. Note that unlike a PUSM, which propagates from one node to its adjacent neighbor at a time, a PIIM flows directly between edge nodes and hence will rely on a routing capability. One option is to send it as a regular IP packet using standard IP addressing, from the terminating node to the originating node. Another option is to use one of the reverse MPLS paths from the terminating node to the originating node. For example, a PIIM from edge node F to edge node E could be transmitted along the path indicated by the Best_Fwdpath(E) register stored at node F.

Variant B retains the advantage of being able to make instantaneous CAC and LB decisions at the source nodes. However, the protocol is a little more complicated, with the addition of a separate PIIM messaging. As discussed below however, this complexity can be virtually eliminated in some cases such as VoIP, by taking advantage of certain existing protocol features provided by the application.

Variant C:

Apart from dropping the Rev_opt field from PUSM's, Variant C also eliminates the Best_Fwdpath(.) registers at the originating edge routers. Consequently the ability to make instantaneous CAC and LB decisions at the source nodes is lost. When a call destined for edge node F arrives at edge node E, a Path Status Query Message (PSQM) is transmitted from the latter to the former. In response, node F relays the contents of the local Best_Revpath(E) in a Path Status Response Message (PSRM) to node E, and the latter makes the CAC and LB decisions based on the content of the received PSRM. Both PSQM and PSRM are transmitted based on standard IP addressing and forwarding.

As is clear, the disadvantage with Variant C is that it slows the CAC and LB decision somewhat, due to the need to query the terminating end-points. However, in applications such as VoIP, this may not have any perceptible effect since both end-points are queried in any case due to the bi-directional nature of the traffic payload or packet streams.

Figure 4C:
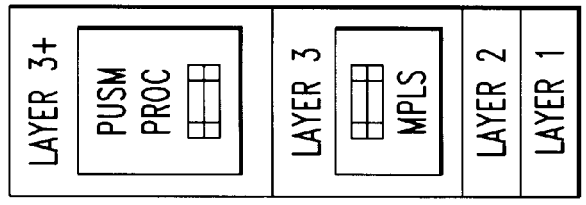
FIG. 4 is a graphical depiction of alternative levels of the protocol hierarchy at which the path utilization status message processing can occur.
Figure 4B:
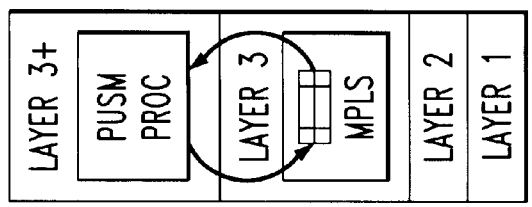
Figure 4A:
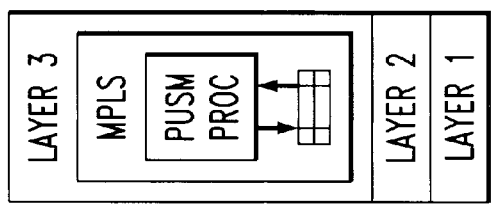

Reference to FIGS. 4A–C illustrates three embodiments capable of implementing the PUSM processing (Pgen/PSEL at the edge routers 14 and PSP at the transit routers 16) and forwarding capabilities. For convenience, these are labeled (A) full integration with MPLS, (B) partial integration with MPLS and (C) complete decoupling from MPLS. In all the three cases, the PUSM processor has access to the link measurement parameters in a uniform fashion.

In the fully integrated embodiment of FIG. 4-A, the PUSM processing function is tightly integrated with MPLS. Specifically, the shim header that facilitates label switching is expanded to include an additional bit called the PUSM bit. With this in place, each PUSM packet can be forwarded like any label-switched packet, along the path for which it is tracking the cost metric. The difference, however is that the PUSM bit is set to FALSE for normal MPLS packets carrying payload traffic, whereas it is set to TRUE for PUSM packets. In fact there is no need to add a new bit to the MPLS label format, since one of the already available "experimental bits" in the label can be used for the PUSM bit. With the MPLS encapsulation, a distinct Tag field 34 is no longer needed within the PUSM payload as shown in FIG. 3, and this can be eliminated. The MPLS forwarding paradigm may be modified to examine the status of the PUSM bit. If FALSE, forwarding should proceed in the conventional manner. If TRUE, the PUSM processing function (Pgen/PSEL at the edge nodes and PSP at the transit nodes), which now forms an integral part of MPLS, should be invoked prior to forwarding the packet. The latter would then access the ILM database to extract Lnk (.) and Tag (.) to perform the Pgen and PSP operations described above. From a protocol perspective, the PUSM processing capability now resides at layer 3, as a sub-function of the MPLS module (FIG. 4-A). Note that this approach offers significant simplicity and elegance, however it needs modifications to the existing MPLS forwarding paradigm.

In the partially integrated embodiment of FIG. 4-B, PUSM processing is implemented separately from MPLS, as a distinct module above layer 3. However, the former is allowed to read the Tag(.) and Lnk(.) parameters (Pgen and PSP) from the forwarding ILM database maintained by the latter. PUSM packets are now transmitted from one node to an adjacent neighbor based on its IP header address field; MPLS forwarding is not invoked. This implies that a distinct Tag field 34 should be retained within the PUSM payload, as indicated in FIG. 3. One way to recognize a received PUSM packet in this case and pass on to the local PUSM processing function is to assign a special value to the Class-Based Queueing (CBQ) field in its IP header. Alternately the class of service may be specified as TCP/UDP, with a special SAP port being designated to link such packets to the PUSM processing function. In any case, it is not clear whether a full-scale IP header and the associated processing is necessary here, since the transmission of PUSM's is only between adjacent neighbors at a time. While this approach does not demand modifications to the existing MPLS protocol, it takes advantage of the simplicity in extracting the necessary parameters directly from the ILM database maintained by MPLS. This requires that suitable hooks are in place such that the PUSM processing function, which is now external to the MPLS forwarding mechanism, is allowed to access the forwarding ILM.

The completely decoupled embodiment of FIG. 4-C is similar to case B described above, with the additional restriction that sharing of the ILM database is not allowed. In this sense, the PUSM processor can be built as an independent application above layer 3 and no modifications or hooks, whatsoever, is required of the MPLS forwarding engine. Undesirably, however, the PUSM processor now needs to maintain a copy of the forwarding database, albeit limited in scope to the explicit MPLS paths that carry QoS-sensitive and connection-oriented applications. This copy of the forwarding database is referred to here as the ILM mirror.

As may be expected, a given router could be a transit node in regard to certain MPLS paths, and an edge node in regard to the others. Thus a generic router that supports the capabilities discussed here is equipped with all the three functional modules, namely, Pgen, PSP and PSEL. A question however exists as to how a router can determine whether an incoming PUSM is destined for the PSP module (if the router is a transit node) or the PSEL module (if the router is the terminating edge node). Preferably, the NHLFE in the ILM database (actual or the mirror), corresponding to the incoming PUSM's Tag, indicates a "stack pop" operation when the terminating end has been reached. Thus, by examining this condition, a decision can be made as to which module should receive the PUSM in question.

Those skilled in the art will recognize that the methodology proposed will carry through naturally to the hierarchical variant of MPLS. In this case the MPLS shim header appended to each packet is comprised of a stack of labels, each of which corresponds to a different level of the hierarchy. This allows effective "tunneling" of MPLS paths and optimizes the use of the MPLS tag address space.

Figure 5:
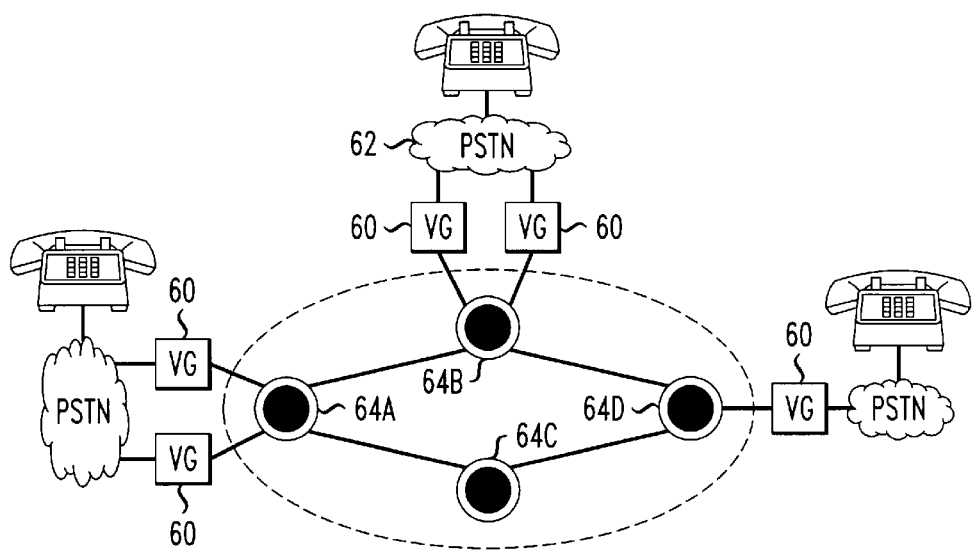
FIG. 5 is a more detailed illustration of a network upon which the present invention may be practiced.

With reference now to FIG. 5, an exemplary Voice-over-IP (VoIP) application of the methodology is depicted. One key difference here is that each call manifests as two distinct flows of packets. The forward and reverse voice paths for each active voice call are treated as independent; in particular they could traverse completely different physical routes. Referring to FIG. 5, an embodiment that is applicable in an exemplary VoIP network scenario based on the generalized H.323 model is illustrated. Since each gateway 60 in this scenario can independently format and insert voice packets into the network, the MPLS paths should ideally originate at the gateways 60 for simplicity. However, distinct MPLS paths are envisaged only among pairs of edge routers 64, not among pairs of gateways 60. The latter is less attractive from a scalability point of view, given that there could be multiple gateways homing on to each edge router. Note also that there are no distinct edge and transit routers in FIG. 5. For example, router 64A is an edge node for paths originating or terminating at the gateways 60 attached to it, whereas it can be a transit router for a path between router 64B and router 64C.

Figure 6:
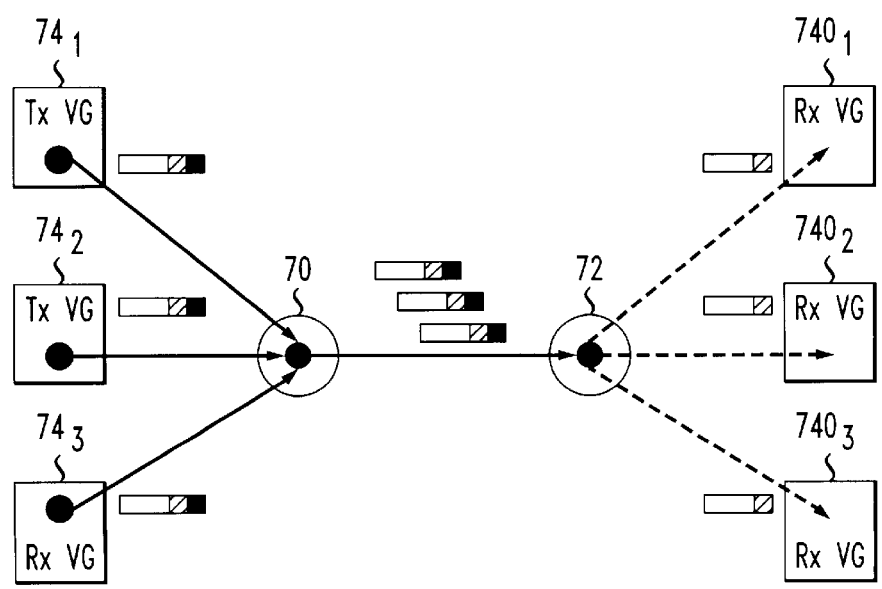
FIG. 6 shows an embodiment of a recommended packet forwarding strategy used in the invention, by focusing on a single path between edge routers.

The need for distinct MPLS paths between every pair of gateways is eliminated here (and substituted by distinct paths set up between each pair of routers) by using the hybrid forwarding strategy shown in FIG. 6. A transmitting edge router 70 and a receiving edge router 72 are shown with three attached gateways each: $74_1 \ldots 74_3$ and $740_1 \ldots 740_3$. For ease of description, a single MPLS path is set up between the two edge routers 70, 72; i.e., there is no load balancing option. Additionally, a call is in progress from transmitting VG $74_1$, to receiving VG $740_1$, one from transmitting VG $74_2$ to receiving VG $740_2$ and one from transmitting VG $74_3$ to receiving VG $740_3$.

Each transmitting gateway 74 has available two pieces of information for the call it handles, namely, the IP address of the receiving gateway 740 and an MPLS tag for the path (in this case unique) from the transmitting edge router 70 to the receiving edge router 72. Each voice packet is first encapsulated into an IP packet the address field of which is set to the receiving gateway's address, and then into an MPLS frame with its tag set to that of the preset path. Note that all the three transmitting VG's 74 are programmed to use the same MPLS tag, which gets mapped into an identical NHLFE within the transmitting edge router's ILM. Hence the packet streams that the three transmitting VG's 74 generate are merged at the transmitting edge router 70, and forwarded along the unique MPLS path to the receiving edge router 72. The NHLFE corresponding to the composite stream within the receiving edge router's ILM is programmed to indicate a "stack pop" operation. As a result, the MPLS stack of each received packet becomes empty and is therefore handed off to the conventional IP forwarding engine. Since the IP address field indicates the specific receiving voice gateway, each packet is delivered to the appropriate destination.

For the establishment of a voice call, the VoIP system includes, besides the voice gateways 74, 740 and the IP transport network shown in FIGS. 5–6, a set of signaling gateways, voice gateway controllers and gatekeepers along with the associated database engines. Call signaling proceeds according to the standard procedures stipulated by the H.323 protocol model. A circuit-switched voice path is first established across the PSTN domain between the calling end-user and the nearest voice gateway 74. A signaling message is then propagated through the SS7 network attached to the caller side PSTN to a signaling gateway which routes this message to a suitable voice gateway controller. The latter alerts the calling end voice gateway 74 and propagates the key parameters to a gatekeeper responsible for gateway 74. The gatekeeper identifies and negotiates with another gatekeeper responsible for the receiving end of the call (if different from the calling end gatekeeper). The latter in turn identifies the receiving end voice gateway 740 and signals the PSTN network on the receiving side. A circuit-switched voice path is then established across the receiving end PSTN between the receiving voice gateway 740 and the called end-user. Once these conventional steps are completed, a few additional actions need to be taken to implement call admission control and load balancing using the algorithm proposed here. These are described below.

To facilitate call management each VG 74, 740 maintains the vector [Best_Fwdpath(.)] with $n_e$-1 entries, one corresponding to each of the $n_e$-1 remote edge nodes (excluding the one to which the VG is attached). As explained below, this vector is periodically updated as a result of PUSM propagation (customized to VoIP). In addition, each VG 74, 740 also maintains the static matrix [$Tag_{ER}(F, i)$] of dimension ($n_e-1$)×r. As described above, each entry in this matrix stores the outgoing MPLS tag corresponding to one of the r paths to one of the $n_e-1$ remote edge routers, excluding the one to which the VG 74, 740 is attached. As is clear, there is no need to maintain the matrix [$Lnk_{ER}(F, i)$] here since the VG 74, 740 is strictly an access device and there is a unique outgoing link. Indeed, the algorithms can be generalized to the scenario where each VG may home on to multiple edge routers.

For example, two gateways $74_1$ and $740_2$ are assigned to a candidate call, having routers 70 and 72 attached. During call setup, VG $74_1$ receives from the associated gatekeeper the IP address of the remote voice gateway VG $740_2$ as well as the identity of the remote edge router 72. The latter is used to look up the corresponding local Best_Fwdpath(.) entry. For the purpose of identifying the remote router 72, either its IP address, or a globally consistent VoIP index number assigned to it, may be conveyed. The latter has the advantage of simplifying the table lookup at the gateway to an array indexing operation. Note that agreeing on such an indexing scheme is not difficult, since there could be perhaps 100 or at the most 1000 edge nodes supporting VoIP services within an administrative domain. The candidate call is deemed admissible at VG $74_1$ if all of the following conditions are satisfied:

1. A free voice port is available at VG1 $74_1$ to carry the new call
2. There is adequate residual bandwidth available to support the call on the forward link to router 70
3. There is adequate residual bandwidth available to support the call on the reverse link from router 70
4. Best_Fwdpath>0

An analogous procedure occurs at gateway VG $740_2$. Once the CAC decisions at both ends are successful, a confirmation is returned to the gatekeeper(s) involved and the call is now complete. If a failure occurs at either end, the call is blocked and cleared. Upon successful completion VG $74_1$ would use the IP address of VG $740_2$ provided by the gatekeeper, and the MPLS tag provided by the map $Tag_{ER}$(R2, Best_Fwdpath(R2)), for forwarding all payload packets belonging to the call. Similarly, VG $740_2$ would use the IP address of VG $74_1$, obtained from its gatekeeper and the MPLS tag provided by the local map $Tag_{ER}$(R1, Best_Fwdpath(R1)). To complete the description, it is noted that there are a few additional standard procedures implemented for distinguishing the particular call (from other calls at the two end gateways. These procedures are based on well-known protocols and functions implemented above the IP layer (e.g., RTP), as known to those skilled in the art.

Figure 7:
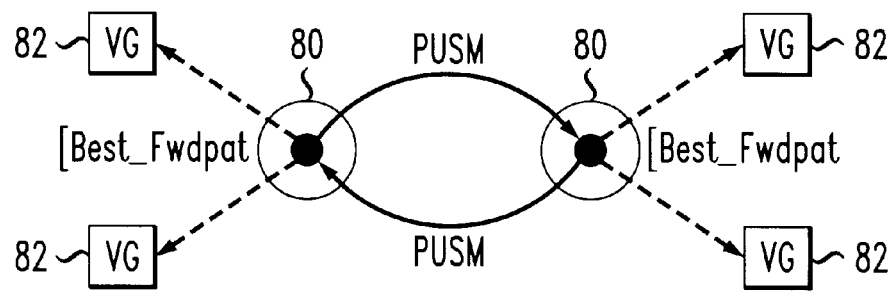
FIG. 7 illustrates one embodiment of functionality allocation among routers and gateways in order to implement the invention.

With reference to FIG. 7, all transit nodes could include the PSP module and all edge routers could include the Pgen and PSEL modules. Due to the possible overlap in the edge and transit roles of routers, all the three modules may need to be implemented on all routers 80. The PSEL function tailored to generalized VoIP needs a small enhancement though. Whenever the value of Best_Fwdpath(F) at an edge node E corresponding to another node F changes as a result of the actions discussed earlier, the new value is relayed to all the gateways attached to node E. The gateways 82 in turn use the new value to update their own [Best_Fwdpath(.)] vectors. The relaying of these parameters from edge routers to the attached gateways can be based on conventional IP forwarding.

Figure 8:
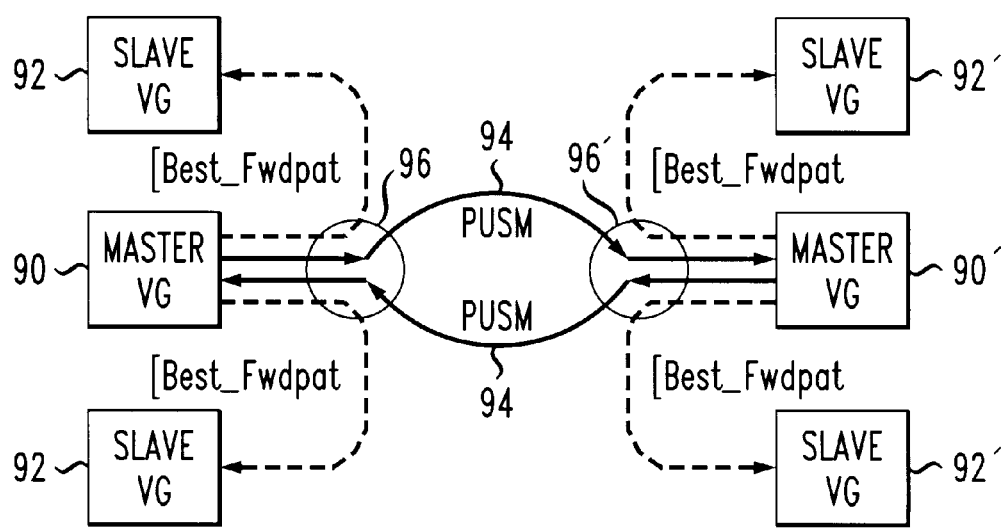
FIG. 8 shows an alternate embodiment with the routers requiring fewer control capabilities compared to the variant shown in FIG. 7.

An alternative option exists where the IP routers, including transit as well as edge nodes, implement only the PSP module. The advantage here is that the routers are now required to provide only a uniform and relatively simple capability, namely, PSP. They are unburdened from performing the relatively complex operations needed by Pgen and PSEL, and furthermore, from having to maintain path state variables, i.e., [Best_Fwdpath(.)], [Best_Revpath(.)] and [Path cost(., .)]. This mode of implementation is illustrated in FIG. 8 where one of the gateways attached to each edge router is designated as a master voice gateway 90; the remaining gateways are slave voice gateways 92. The master VG 90 now implements Pgen and PSEL. Consequently the PUSM's 94 are generated and inserted into the network by the master VG's. Edge routers 96 behave exactly like transit routers, processing and forwarding PUSM's either towards an adjacent router or the attached master VG 90 depending on the direction of propagation. Thus a PUSM 94 originates at a master gateway 90 and terminates at another master gateway 90' at a remote point. With this PUSM propagation model, the links that attach the master gateways 90 to the corresponding edge routers are treated as bandwidth unlimited; i.e., the associated link costs are zero by definition. This is because the management of VG-to-router links is not regarded as part of the distributed CAC and LB function. These links are locally managed by the VG's, as indicated by the second and third clauses of the admissibility criteria given above. As is clear, the master VG 90 now maintains and manipulates all the key data structures such as [Best_Fwdpath(.)], [Best_Revpath(.)] and [Path_Cost(., .)]. Furthermore, whenever a change occurs to the value of Best_Fwdpath(F) at a master VG corresponding to the remote edge router F, the new value is relayed to all the slave VG's that share a common edge router with the master VG. This is done by conventional IP forwarding via the common edge router.

So far the discussion on VoIP CAC & LB implicitly assumed the adoption of Variant A of the algorithm. However, the strategy shown in FIG. 8 allows elegant mechanisms to adopt Variant B and Variant C as well. In both cases, the Rev_opt field 38 is eliminated from the PUSM.

Variant B for VoIP:

As discussed before, here an explicit PIIM is sent from a terminating edge node 96' to the originating edge node 96, in order to convey the identity of the preferred path to be used by the latter 96, as determined by the former 96'. This capability may be easily integrated within the existing VoIP primitives. Specifically, the RTP sessions that carry live voice calls between master gateways 90 would have associated RTCP sessions for performance monitoring purposes. The PIIM's may be piggybacked on the RTCP packets sent routinely from terminating master VG's 90' to originating master VG's 90. However, at least one RTCP session should always be active between every pair of master gateways for this approach to be reliable.

Variant C for VoIP:

As discussed, Variant C allows the path terminating nodes to make CAC and LB decisions, rather than the originating nodes. This however necessitates additional interactions between the edge nodes during call setup, which can be a nuisance for unidirectional calls. On the other hand, a VoIP call by nature sets up two circuits, and the associated interactions between the two end-points are already in place. Thus, Variant C does not incur additional burden in the VoIP application scenario. In this embodiment, the set of variables [Best_Fwdpath(.)] are eliminated at the master 90 as well as slave VG's 92. Also, the master VG relays to slave VG's the value of Best_Revpath(.) instead, during changes.

In this embodiment when a gateway VG1 either initiates a call to a remote gateway VG2 attached to router R2, or receives a setup request from the remote end forwarded by the local gatekeeper, it simply returns the value of Best_Revpath(R2) to the gatekeeper. If this shows a negative value it automatically implies call rejection. To be precise, the gateway also checks the port and access link bandwidth availability as described earlier, and forces the return of a negative value to the gatekeeper if one of these clauses failed. The gatekeeper(s) checks the values returned by the two gateways; if either is negative, the call is blocked and cleared. Otherwise the gatekeeper(s) swaps the path index numbers it obtained from the concerned VG's and relays them back to the VG's. Call set up is now complete and the VG's can send the voice payload over the paths corresponding to the indices forwarded to them by the gatekeeper(s).

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of regulating admission of an incoming packet stream to a network, comprising the following steps:
   a) at selected times, sending a first path status message from an originating node associated with the network to a terminating node associated with the network along a first defined path through the network between the originating and terminating nodes, wherein the first path status message includes a cost metric indicative of utilization of the first defined path;
   b) updating the cost metric in the first path status message as the first path status message progresses along the first defined path to the terminating node;
   c) determining routing information based on the cost metric in the first path status message received by the terminating node;
   d) selectively sending an admission control message from the terminating node to the originating node, wherein the admission control message includes the routing information; and
   e) receiving the incoming packet stream at the originating node and, based on the routing information in the admission control message received by the originating node, determining whether to admit or block the incoming packet stream.

2. The method as set forth in claim 1, further comprising the following steps:
   f) at selected times, sending an additional path status message from the originating node to the terminating node along each additional defined path of one or more additional defined paths through the network between the originating and terminating nodes, wherein each additional path status message includes the cost metric, wherein the cost metric is indicative of utilization of the corresponding additional defined path;
   g) updating the cost metric in each additional path status message as the corresponding additional path status message progresses along the corresponding additional defined path to the terminating node; and
   h) if the incoming packet stream is admitted in step e), based on the routing information, selecting an optimal defined path from the first and additional defined paths between the originating and terminating nodes for routing the incoming packet stream to the terminating node;
   wherein the routing information determined in step c) is also based on the cost metric in each additional path status message received by the terminating node.

3. The method as set forth in claim 2 wherein each defined path of the first and additional defined paths includes at least one interconnected link between the originating and terminating nodes and at least one of the first and additional defined paths comprise a plurality of interconnected links and at least one transit router.

4. The method as set forth in claim 3 wherein the cost metric in each path status message is indicative of utilization of the corresponding defined path through at least a bottleneck link associated with the corresponding defined path.

5. The method as set forth in claim 4 wherein each bottleneck link is expressed as a percentage utilization for a most utilized link in the corresponding defined path, wherein the corresponding defined path whose bottleneck link is lowest among each bottleneck link for the first and additional defined paths is included in the routing information determined in step c).

6. The method as set forth in claim 4 wherein each bottleneck link is expressed as an absolute residual capacity for a least absolute residual capacity link in the corresponding defined path, wherein the corresponding defined path whose bottleneck link is highest among each bottleneck link for the first and additional defined paths is included in the routing information determined in step c).

7. The method as set forth in claim 4 wherein the cost metric in each path status message is also indicative of a quantity of interconnected links associated with the corresponding defined path, wherein the routing information in step c) is determined at least in part by considering the quantity of interconnected links for each defined path, wherein defined paths having fewer interconnected links are favored over defined paths having more interconnected links for defined paths having similar bottleneck links when the routing information is determined.

8. The method as set forth in claim 3 wherein at least one transit router in each of the at least one of the first and additional defined paths having at least one transit router is adapted to discriminate utilization of the corresponding defined path between differing classes of packet streams, wherein the cost metric in each path status message is adapted to be sensitive to utilization of the corresponding defined path by differing classes of packet streams, wherein the updating in steps b) and g) includes updating the cost metric in the corresponding path status message at each transit router adapted to discriminate utilization of the corresponding defined path between differing classes of packet streams based on the discriminated utilization of the corresponding defined path.

9. The method as set forth in claim 3 wherein each transit router in each of the at least one of the first and additional defined paths having at least one transit router is adapted to perform a link usage measurement of the corresponding defined path, wherein the updating in steps b) and g) includes updating the cost metric in the corresponding path status message at each transit router based on the link usage measurement.

10. The method as set forth in claim 3 wherein the routing information identifies the optimal defined path between the first and additional defined paths based on a lowest cost metric among the cost metrics associated with the first and additional defined paths.

11. The method as set forth in claim 10 wherein the admission control message is sent to the originating node when the defined path identified as the optimal defined path changes.

12. The method as set forth in claim 3 wherein the routing information is stored by the originating node after receipt of each admission control message and retrieved after receipt of the incoming packet stream.

13. The method as set forth in claim 1 wherein the selected times that the first path status message is sent from the originating node to the terminating node are based on a predetermined status update interval.

14. The method as set forth in claim 1 wherein the selected times that the first path status message is sent from the originating node to the terminating node are based on receipt of the incoming packet stream at the originating node, wherein, after receipt of the incoming packet stream, the first path status message is sent to the terminating node.

15. A method, comprising:
- a) at selected times, sending a first status message from a source node associated with a network to a destination node associated with the network along each defined path of a first plurality of defined paths through the network between the source and destination nodes, wherein at least one defined path of the first plurality of defined paths includes at least one first transit router between the source and destination nodes, wherein each first status message includes a first cost metric indicative of utilization of each corresponding defined path of the first plurality of defined paths;
- b) updating the first cost metric in each first status message as the corresponding first status message traverses the corresponding defined path of the first plurality of defined paths to the destination node, wherein each first transit router of the at least one first transit router in the at least one defined path of the first plurality of defined paths updates the first cost metric in the corresponding first status message of the corresponding defined path of the first plurality of defined paths as the corresponding first status message progresses through the corresponding first transit router and passes the corresponding first status message with the updated first cost metric on along the corresponding defined path of the first plurality of defined paths;
- c) determining first routing information between the source and destination nodes based on the first cost metric in each first status messages received by the destination node, wherein the first routing information identifies a first optimal defined path from the first plurality of defined paths from the source node to the destination node;
- d) selectively sending a first admission control message from the destination node to the source node, wherein the first admission control message includes the first routing information;
- e) receiving a first payload packet stream at the source node and, based on the first routing information in the first admission control message received by the source node, determining whether to admit or block the first payload packet stream; and
- f) if the first payload packet stream is admitted, based on the first routing information, selecting the first optimal defined path for routing the first payload packet stream to the destination node.

16. The method as set forth in claim 15, further comprising the following steps:
- g) at selected times, sending a second status message from the destination node to the source node along each defined path of a second plurality of defined paths through the network between the destination and source nodes, wherein at least one defined path of the second plurality of defined paths includes at least one second transit router between the destination and source nodes, wherein each second status message includes a second cost metric indicative of utilization of each corresponding defined path of the second plurality of defined paths;
- h) updating the second cost metric in each second status message as the corresponding second status message traverses the corresponding defined path of the second plurality of defined paths to the source node, wherein each second transit router of the at least second first transit router in the at least one defined path of the second plurality of defined paths updates the second cost metric in the corresponding second status message of the corresponding defined path of the second plurality of defined paths as the corresponding second status message progresses through the corresponding second transit router and passes the corresponding second status message with the updated second cost metric on along the corresponding defined path of the second plurality of defined paths;
- i) determining second routing information between the destination and source nodes based on the second cost metric in each second status messages received by the source node, wherein the second routing information identifies a second optimal defined path from the second plurality of defined paths from the destination node to the source node;
- j) selectively sending a second admission control message from the source node to the destination node, wherein the second admission control message includes the second routing information;
- k) receiving a second payload packet stream at the destination node and, based on the second routing information in the second admission control message received by the destination node, determining whether to admit or block the second payload packet stream; and
- l) if the second payload packet stream is admitted, based on the second routing information, selecting the second optimal defined path for routing the second payload packet stream to the source node.

17. The method as set forth in claim 16 wherein the first status message is periodically sent from the source node to the destination node based on a predetermined status update interval, wherein the second status message is periodically sent from the destination node to the source node based on the predetermined status update interval.

18. The method as set forth in claim 17 wherein, when the second admission control message is sent from the source node to the destination node, the second admission control message is included in the first status message sent at the next predetermined status update interval associated with the first status message, wherein, when the first admission control message is sent from the destination node to the source node, the first admission control message is included in the second status message sent at the next predetermined status update interval associated with the second status message.

19. The method as set forth in claim 18 wherein the second admission control message is included in first status message sent at each predetermined status update interval associated with the first status message, wherein the first admission control message is included in the second status message sent at each predetermined status update interval associated with the second status message.

20. The method as set forth in claim 17 wherein the destination node includes a timer associated with the predetermined status update interval and receipt of the first status message via each defined path of the first plurality of defined paths, wherein, for each first status message that is not received before the timer exceeds a predetermined value, the destination node considers the corresponding defined path of the first plurality of defined paths to be blocked when the first routing information is determined in step c), wherein, if all defined paths of the first plurality of defined paths are blocked, the source node blocks the first payload packet stream in step e).

21. The method as set forth in claim 17 wherein the source node includes a timer associated with the predetermined status update interval and receipt of the second status message via each defined path of the second plurality of defined paths, wherein, for each second status message that is not received before the timer exceeds a predetermined value, the source node considers the corresponding defined path of the first plurality of defined paths to be blocked when the second routing information is determined in step i), wherein, if all defined paths of the second plurality of defined paths are blocked, the source node blocks the second payload packet stream in step l).

22. The method as set forth in claim 16 wherein the first cost metric in each first path status message is indicative of utilization of the corresponding defined path in the first plurality of defined paths, wherein determining the first routing information in step c) includes identifying the first optimal defined path based on the lowest first cost metric in the set of first path status messages associated with the current status update interval for the first path status message, wherein the second cost metric in each second path status message is indicative of utilization of the corresponding defined path in the second plurality of defined paths, wherein determining the second routing information in step c) includes identifying the second optimal defined path based on the lowest second cost metric in the set of second path status messages associated with the current status update interval for the second path status message.

23. The method as set forth in claim 16 wherein the first and second payload packet streams are associated with a voice call between a calling party and a called party.

24. A packet-based network for regulating admission of an incoming packet stream, the network including:
   first sending means for sending a first path status message from an originating node associated with the network to a terminating node associated with the network along a first defined path through the network between the originating and terminating nodes at selected times, wherein the first path status message includes a cost metric indicative of utilization of the first defined path;
   first updating means for updating the cost metric in the first path status message as the first path status message progresses along the first defined path to the terminating node;
   means for determining routing information based on the cost metric in the first path status message received by the terminating node;
   means for selectively sending an admission control message from the terminating node to the originating node, wherein the admission control message includes the routing information; and
   means for receiving the incoming packet stream at the originating node and, based on the routing information in the admission control message received by the originating node, determining whether to admit or block the incoming packet stream.

25. The network as set forth in claim 24, further including:
   second sending means for sending an additional path status message from the originating node to the terminating node along each additional defined path of one or more additional defined paths through the network between the originating and terminating nodes at selected times, wherein each additional path status message includes the cost metric, wherein the cost metric is indicative of utilization of the corresponding additional defined path;
   second updating means for updating the cost metric in each additional path status message as the corresponding additional path status message progresses along the corresponding additional defined path to the terminating node; and
   means for selecting an optimal defined path from the first and additional defined paths between the originating and terminating nodes for routing the incoming packet stream to the terminating node if the incoming packet stream is admitted by the receiving means, wherein the selecting of the optimal defined path is based on the routing information;
   wherein the routing information is also determined by the determining means based on the cost metric in each additional path status message received by the terminating node.

26. A network communication system, comprising:
   first sending means for sending a first status message from a source node associated with a network to a destination node associated with the network along each defined path of a first plurality of defined paths through the network between the source and destination nodes at selected times, wherein at least one defined path of the first plurality of defined paths includes at least one first transit router between the source and destination nodes, wherein each first status message includes a first cost metric indicative of utilization of each corresponding defined path of the first plurality of defined paths;
   first updating means for updating the first cost metric in each first status message as the corresponding first status message traverses the corresponding defined path of the first plurality of defined paths to the destination node, wherein each first transit router of the at least one first transit router in the at least one defined path of the first plurality of defined paths updates the first cost metric in the corresponding first status message of the corresponding defined path of the first plurality of defined paths as the corresponding first status message progresses through the corresponding first transit router and passes the corresponding first status message with the updated first cost metric on along the corresponding defined path of the first plurality of defined paths;
   first determining means for determining first routing information between the source and destination nodes based on the first cost metric in each first status messages received by the destination node, wherein the first routing information identifies a first optimal defined path from the first plurality of defined paths from the source node to the destination node;

first selective sending means for selectively sending a first admission control message from the destination node to the source node, wherein the first admission control message includes the first routing information;

first receiving means for receiving a first payload packet stream at the source node and, based on the first routing information in the first admission control message received by the source node, determining whether to admit or block the first payload packet stream; and first selecting means for selecting the first optimal defined path for routing the first payload packet stream to the destination node if the first payload packet stream is admitted by the first receiving means, wherein the selecting of the first optimal defined path is based on the first routing information.

27. The system as set forth in claim 26, further comprising:

second sending means for sending a second status message from the destination node to the source node along each defined path of a second plurality of defined paths through the network between the destination and source nodes at selected times, wherein at least one defined path of the second plurality of defined paths includes at least one second transit router between the destination and source nodes, wherein each second status message includes a second cost metric indicative of utilization of each corresponding defined path of the second plurality of defined paths;

second updating means for updating the second cost metric in each second status message as the corresponding second status message traverses the corresponding defined path of the second plurality of defined paths to the source node, wherein each second transit router of the at least second first transit router in the at least one defined path of the second plurality of defined paths updates the second cost metric in the corresponding second status message of the corresponding defined path of the second plurality of defined paths as the corresponding second status message progresses through the corresponding second transit router and passes the corresponding second status message with the updated second cost metric on along the corresponding defined path of the second plurality of defined paths;

second determining means for determining second routing information between the destination and source nodes based on the second cost metric in each second status messages received by the source node, wherein the second routing information identifies a second optimal defined path from the second plurality of defined paths from the destination node to the source node;

second selective sending means for selectively sending a second admission control message from the source node to the destination node, wherein the second admission control message includes the second routing information;

second receiving means for receiving a second payload packet stream at the destination node and, based on the second routing information in the second admission control message received by the destination node, determining whether to admit or block the second payload packet stream; and second selecting means for selecting the second optimal defined path for routing the second payload packet stream to the source node if the second payload packet stream is admitted by the second receiving means, wherein the selecting of the second optimal defined path is based on the second routing information.

* * * * *